(12) United States Patent
Felis et al.

(10) Patent No.: US 11,597,634 B2
(45) Date of Patent: Mar. 7, 2023

(54) METHOD OF PLANNING PLATFORM LIFT

(71) Applicant: TK Home Solutions B.V., Krimpen aan den Ijssel (NL)

(72) Inventors: Thomas Felis, Seattle, WA (US);
Pieter-Bas De Kleer, Delft (NL);
Simon Feismann, Meerbusch (DE);
Isaak Modaser Saba, Essen (DE)

(73) Assignee: T.K. HOME SOLUTIONS B.V., Krimpen aan den Ijssel (NL)

( * ) Notice: Subject to any disclaimer, the term of this patent is extended or adjusted under 35 U.S.C. 154(b) by 279 days.

(21) Appl. No.: 16/651,008

(22) PCT Filed: Oct. 2, 2018

(86) PCT No.: PCT/EP2018/076867
§ 371 (c)(1),
(2) Date: Mar. 26, 2020

(87) PCT Pub. No.: WO2019/068737
PCT Pub. Date: Apr. 11, 2019

(65) Prior Publication Data
US 2020/0307959 A1 Oct. 1, 2020

(30) Foreign Application Priority Data
Oct. 4, 2017 (EP) ..................................... 17194814

(51) Int. Cl.
*B66B 9/08* (2006.01)
*G06F 30/13* (2020.01)
(Continued)

(52) U.S. Cl.
CPC .............. *B66B 9/08* (2013.01); *B66B 9/0846* (2013.01); *G06F 30/13* (2020.01);
(Continued)

(58) Field of Classification Search
CPC ......... B66B 9/08; B66B 9/0846; G06F 30/13; G06F 2119/18; G06Q 50/08; G06T 19/006
See application file for complete search history.

(56) References Cited

U.S. PATENT DOCUMENTS 8,326,590 B2 * 12/2012 Kock ................. G05B 19/4061
703/8
9,086,700 B2 * 7/2015 Fernando ............. G05D 1/0214
(Continued)

FOREIGN PATENT DOCUMENTS

CN 101894182 A 11/2010
CN 102214261 A 10/2011
(Continued)

OTHER PUBLICATIONS

Meng, Q. & Lee, M.H. "Design Issues for Assistive Robotics for the Elderly" Advanced Engineering Informatics, vol. 20, issue 2, pp. 171-186 (2006) available from <https://www.sciencedirect.com/science/article/pii/S1474034605000923> (Year: 2006).*

(Continued)

*Primary Examiner* — Jay Hann
(74) *Attorney, Agent, or Firm* — Dinsmore & Shohl LLP

(57) ABSTRACT

A method of planning a platform lift, in particular a stairlift, at a stair, the platform lift including a rail, a platform, in particular a chair, a drive unit for driving the platform along the rail, wherein the platform is attached to the drive unit. The method includes acquiring 3D stair data of a stair on which the platform lift is to be installed; calculating based on the acquired 3D stair data a path of travel of the rail, and by retrieving manufacturing constraints, in particular from a database, calculating a feasible path of travel under consideration of the retrieved manufacturing constraints.

9 Claims, 6 Drawing Sheets

(51) Int. Cl.
*G06F 119/18* (2020.01)
*G06Q 50/08* (2012.01)
*G06T 19/00* (2011.01)

(52) U.S. Cl.
CPC .......... *G06F 2119/18* (2020.01); *G06Q 50/08* (2013.01); *G06T 19/006* (2013.01)

(56) References Cited

U.S. PATENT DOCUMENTS

| | | | | |
|---|---|---|---|---|
| 9,165,405 | B2* | 10/2015 | Meier | G06T 19/006 |
| 9,436,427 | B2* | 9/2016 | Hsieh | G06T 11/60 |
| 9,958,858 | B2* | 5/2018 | Loberg | G06F 30/13 |
| 10,782,668 | B2* | 9/2020 | Wang | G06T 19/006 |
| 2015/0049187 | A1 | 2/2015 | Van der Sluijs et al. | |
| 2015/0324940 | A1* | 11/2015 | Samson | G06F 30/13 705/7.23 |
| 2017/0243365 | A1* | 8/2017 | Nuijten | B66B 9/0846 |

FOREIGN PATENT DOCUMENTS

| | | |
|---|---|---|
| CN | 102622486 A | 8/2012 |
| CN | 103345563 A | 10/2013 |
| CN | 103632003 A | 3/2014 |
| CN | 104112041 A | 10/2014 |
| CN | 104699900 A | 6/2015 |
| CN | 104881515 A | 9/2015 |
| CN | 105117541 A | 12/2015 |
| CN | 105138315 A | 12/2015 |
| CN | 105574229 A | 5/2016 |
| CN | 105945942 A | 9/2016 |
| CN | 106250602 A | 12/2016 |
| CN | 106354939 A | 1/2017 |
| CN | 106796101 A | 5/2017 |
| CN | 107220461 A | 9/2017 |
| EP | 1 554 210 A | 7/2005 |
| EP | 2 825 841 B | 1/2015 |
| EP | 3225580 | 10/2017 |
| EP | 3 225 581 B | 6/2019 |
| JP | H 07200668 A | 8/1995 |
| JP | 2002-038685 A | 2/2002 |
| WO | 2004/037703 A | 5/2004 |
| WO | 2015/052489 A | 4/2015 |
| WO | 2016/028146 A1 | 2/2016 |

OTHER PUBLICATIONS

International Search Report issued in PCT/EP2018/076867, dated Nov. 26, 2018.
U.S. Appl. No. 62/487,624.
Microsoft HoloLens: Microsoft HoloLens: Partner Spotlight with thyssenkrupp, Apr. 20, 2017 (Apr. 20, 2017), p. 1 https://www.youtube.com/watch?v=IgtHnCJJUMU.
First Office Action, dated Jan. 12, 2021, in foreign counterpart Chinese application No. 201880064934.8.

* cited by examiner a)

b)

METHOD OF PLANNING PLATFORM LIFT

CROSS REFERENCE TO RELATED APPLICATIONS

This application is a U.S. National Stage Entry of International Patent Application Serial Number PCT/EP2018/076867, filed Oct. 2, 2018, which claims priority to European Patent Application No. EP 17194814.4, filed Oct. 4, 2017, the entire contents of both of which are incorporated herein by reference.

FIELD

The present disclosure generally relates to a method of planning platform lift.

BACKGROUND

A platform, in particular a stairlift, lift is a product which is typically meant for people with impaired mobility, mostly elderly people, to provide support to get upstairs and downstairs without removing the staircase and thus maintaining the functionality of the stairs for persons which are (still) able to climb the stairs themselves. The platform lift is often installed in people's homes and typically comprises a drive unit with a chair or another platform, driven by a drive, which drives along a rail, mounted on or along one or more staircases.

EP 1 554 210 A1 discloses a platform lift for the use of a disabled person in a wheelchair. WO 2013/129923 A1 discloses a platform lift in the form of a stairlift. In both cases the platform is part of a drive unit which travels along at least one guide rail. A leveling mechanism is provided to hold the platform always in a horizontal orientation, even if the inclination angle of the guide rail is changing along the path of travel. In particular the rail of such platform lifts has a curved shape, like shown in FIG. 3 of WO 2015/052489 A1.

The rail is individually adjusted to the shape of the stair. Consequently the design of the rail is developed individually for each individual lift installation. Currently this development takes several steps, which are in particular performed in several times for one installation. First, the spatial shape of the stairlift is recorded by taking several photographs. Thereby the stairs are marked with markers. By means of picture analysis the pictures are analyzed to get a digital 3D model of the stairlift.

The U.S. provisional application U.S. Ser. No. 62/487,624 (not published yet, filed 20 Apr. 2017) provides a method of planning a platform lift. Here a method of acquiring 3D data of a staircase is provided. Based on the acquired 3D data a preliminary rail can be drafted. The rail is in main drafted based on predetermined clearance informations; clearance informations may comprise requirements such as a predefined minimum distance between the rail and any part of the stairs or a wall.

EP 3 225 580 A1, published after the priority date of the present application, discloses a method for designing a stairlift based on simulation. Here the stairlift comprises two rails, which in main are arranged parallel to each other along a curved path of travel. In a first step a course of a first rail is designed; in a subsequent step a course of a second rail is designed based on the course of the first rail. No database query is performed to check whether the rails conform to manufacturing constraints.

EP 2 825 841 B1 shows another method of acquiring 3D data of stairs for planning a stairlift.

WO 2016/028416 A1 discloses a method for method for designing a stairlift rail assembly. Thereby automatically a position of support interfaces is determined, at which the rail can be fastened to the stairlift or an adjacent wall. The method proposes to establish a path travel without doing any crosscheck, whether the designed path of travel can be manufactured. So the customer may see a presentation of a stairlift without any confidence and weeks later the manufacturing plant gives an indication that the designed stairlift cannot be manufactured at all. No database query is performed to answer the question whether the designed rail can be manufactured.

Thus a need exists for an improved method for planning a platform lift.

DETAILED DESCRIPTION

Figure 1:
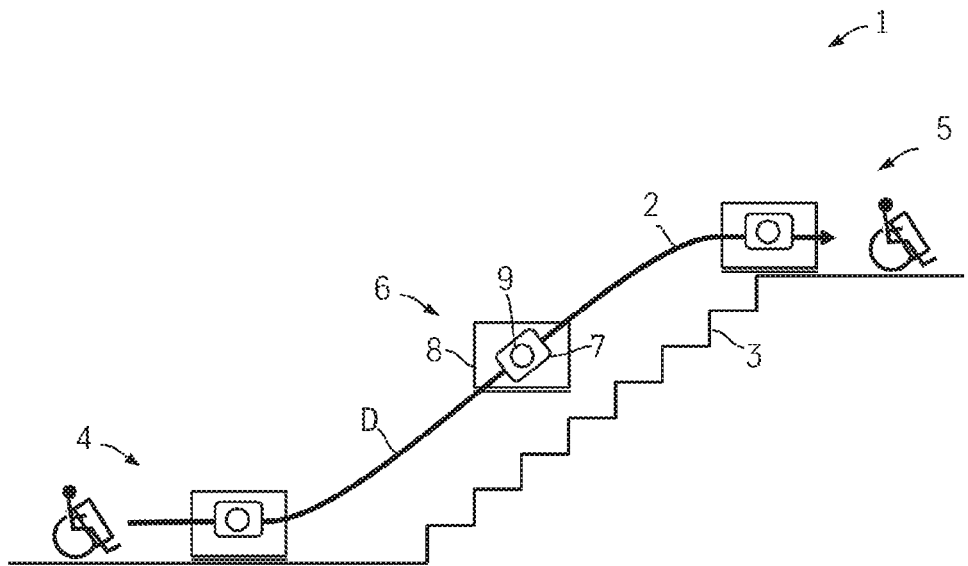
FIG. 1 is a side view of two platform lifts.
Figure 1:
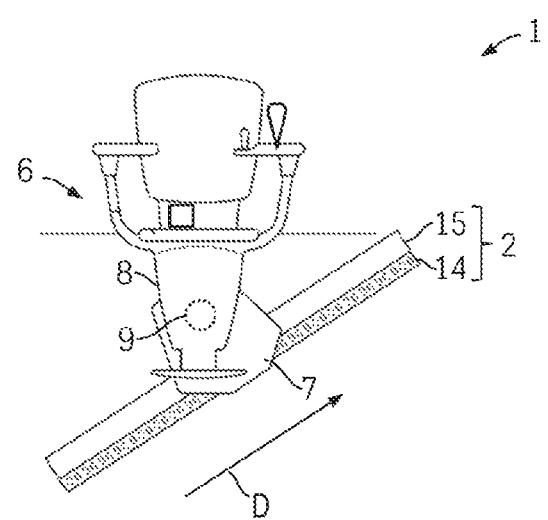

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention refers to a method of planning platform lift.

The inventive method of planning a platform lift comprises the steps
  acquiring 3D stair data of a stair on which the platform lift is to be installed;
  calculating based on the acquired 3D stair data a path of travel of the rail; the method is characterized by
  retrieving manufacturing constraints, in particular from a database,
  calculating a feasible path of travel under consideration of the retrieved manufacturing constraints.

The 3D stair data comprise relevant 3D data of the stair, which is necessary to reconstruct the spatial shape of the stair in an IT based way. Having the shape of the stairs available electronically the path of travel can be calculated, so a rail matching the path of travel may fit into the real staircase.

In particular the term "manufacturing constraints" describes a set of data defining the scope of what can be manufactured from a technical point of view. So a rail needs to conform with the manufacturing constraints in order to be manufacturable. A rail which do not conform with the manufacturing constraints cannot be manufactured, in particular because the available manufacturing tools cannot produce such a rail. This is in more detail described later with reference to FIG. 3. In particular the term "path of travel" defines in general the main shape of the rail, along which the platform may travel. Within this application the path of travel can take the embodiment of a feasible path of travel and a non feasible path of travel. The non feasible path of travel is a path of travel which does not conform with at least one manufacturing constraint; in other words, the manufacturing plant cannot produce a rail, which is defined by the not feasible path of travel. The feasible path of travel is a path of travel which does conform with manufacturing constraints; in other words, the manufacturing plant can produce a rail, which is defined by the feasible path of travel. According to the invention a bill of material for producing the rail and/or stairlift can be established if the path of travel is a feasible path of travel which requires a consideration of the manufacturing constraints during the step of calculating the feasible path of travel.

In particular for the feasible path of travel it is validated, that a rail supporting the feasible path of travel can be manufactured.

In an embodiment 3D platform data, representing the platform in one or several positions along the calculated path of travel are calculated. Since from the previous calculation the path of travel is electronically available, the system can calculate the 3D platform data representing the platform in a position, which is realistic at a stairlift, manufactured in accordance with the calculated path of travel.

In an embodiment 3D person data, representing the person sitting on the platform in one or several positions along the calculated path of travel are calculated. Since from the previous calculations the path of travel and in particular the position of platform is electronically available, the system can calculate the 3D person data representing the person in a position, which is realistic at a stairlift, manufactured in accordance with the calculated path of travel. A user input In an embodiment the 3D stair data are acquired by means of an augmented reality device, in particular mixed reality device. Here the user can see through the augmented reality device, which is at the same time able to perform a 3D scan of the staircase.

In an embodiment the calculated path of travel is visualized on a screen of an augmented reality device, in particular the aforementioned device used again. The path of travel may be visualized by projecting rail on the screen of the device, which centerline is identical to the calculated path of travel.

In an embodiment the step of acquiring 3D environmental data, in particular by means of an augmented reality device, in particular the aforementioned device used again. The environmental data comprise the spatial information of objects in the vicinity of the stairlift in particular not belonging to the stair lift or the stairs itself), which may affect the use of the stairlift.

In an embodiment the step of detecting a collision situation between the 3D platform data according and/or the 3D person data on the one hand and the environment and/or the 3D environmental data according to the previous claim on the other hand.

Here the 3D environmental data may be used to detect any intersection of the 3D person or platform data with the 3D environmental data. Alternatively the system merely detects a collision merely by optically evaluating if the virtual platform or person projected on the screen is optivally colliding with the picture of the obstacle, In an embodiment the step of detecting is performed with the help of a virtual stairlift representation and/or a virtual person, displayed in on or several positions along the path of travel, in particular along the feasible path of travel.

In an embodiment system of automatically modifies the path of travel in case a collision situation is detected. Here the modification can be performed with several try and error steps to find a path of travel which avoids the collision situation.

In an embodiment the system automatically modifies the configuration of the platform in case a collision is detected. The modification may comprise a adding a tilting and/or swiveling functionality to the stairlift; and/or amending the tilting and/or swiveling profile along the path of travel.

Here at certain position at the path of travel the system may change the orientation of the platform relative to the rail, to avoid the collision. This amendment constitutes a modification of the configuration.

In an embodiment automatically a bill of material of the stairlift is providing having a rail (2) according to the feasible path of travel, and/or a platform according to the modified configuration. Based on bill of material the cost of the platform lift can be calculated accurately.

In an embodiment the bill of material is being calculated, in particular as soon as the feasible path of travel is approved by a user input.

In embodiment the bill of material is calculated for a plurality of configurations. For each of the configurations a price is calculated. A calculated price is shown together with the presentation of the stairlift according to the associated configuration on the augmented reality device.

FIG. 1 shows two exemplary embodiments of a generic platform lift 1, to which the invention can be applied. In FIG. 1*a* a platform lift 1 for the use with a wheelchair is shown. The platform 8 therefore comprises a lifting ramp, which can travel along a direction of travel D from a first landing area 4 to a second landing area 5. The direction of travel D is defined by a rail 2 and is limited in main by the course of an existing stairway 3 in a house. An alternative embodiment is shown in FIG. 1*b* wherein the platform 8 comprises a seat.

The rail 2 has a curved shape, which deviates from a straight line; thus the direction of travel will change at least once during the course of the rail 2.

The platform 8 is part of a drive unit 6, which further comprises a carrier 7. The carrier 7 has non-shown rollers, which roll along a tube 15 of the rail 2. For driving the carrier 7 positive engagements means are provided on the rail 2, which cooperates with driving means, in particular a driven pinion (not shown), of the drive unit 6. FIG. 1*b* shows a rack 14 of the rail 2 as an example of embodiment of positive engagement means, which may be welded to the tube 15 of the rail 2. A leveling mechanism 9 is provided on the drive unit 6, to keep the platform 8 always in a horizontal orientation, even if the inclination of the rail 2 varies during its course.

Figure 2:
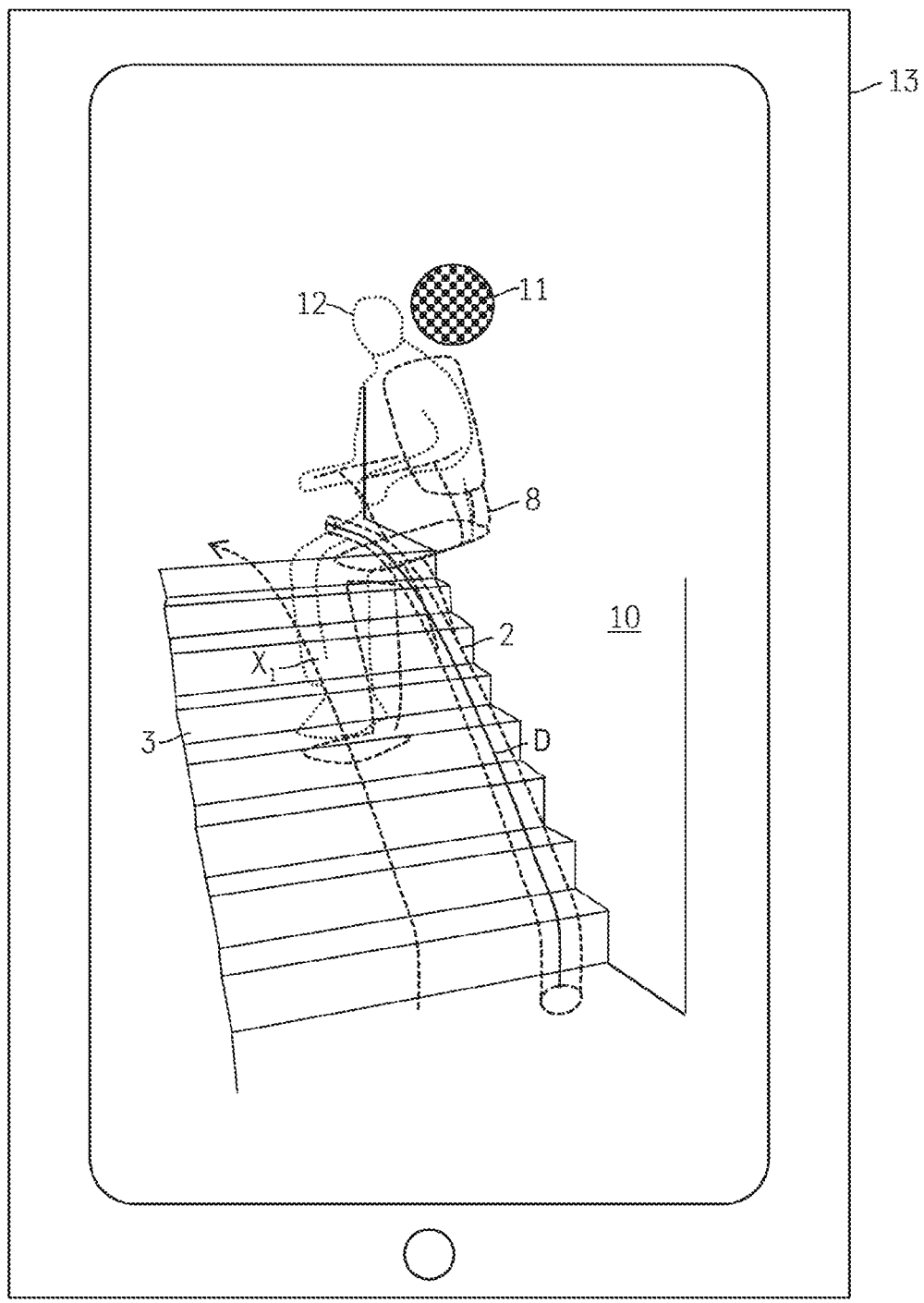
FIG. 2 is a view of an augmented reality device on which a virtual stairlift is presented.

FIG. 2 shows an augmented reality device 13 as described in U.S. Ser. No. 62/487,624 (not published yet), e.g. a tablet PC, in particular equipped with one or several cameras and an acceleration/orientation sensor. When a user aims the device onto a stairlift, the device 13 presents a picture of the stair 3 captured by a camera and a virtual presentation of a platform lift 8, which virtually fits in the environment of the stairs. Optionally a virtual person 12 sitting on the chair 8 of the lift is also presented on the screen of the device 13. To predict a collision with a person sitting on the chair with a real obstacle 11R the position of the virtual person 8 is brought into various positions of the carrier along the path of travel. The collision detection can also be calculated with the help of the coordinates of the obstacle (contained in the acquired data) and the position of the virtual person (based on the calculated path of travel in combination with the position of the virtual person relative to the carrier) can be displayed.

As described in more detail in the U.S. Ser. No. 62/487,624 to avoid a collision between the person and the real obstacle 11R the lift can be tilted or swiveled along several axis, so that in this case the head of the person gets out of the collision risk with the obstacle. The tilted virtual chair along with the tilted virtual person is also presented on the screen of the device.

FIG. 3 shows again the presentation of the stairs and environment as in real time captured by the camera of the device 13. Since the device is also capable of respective 3D data of the stairs 3 and the wall 10, the device has an overall spatial knowledge of the shown elements. The device retrieves predetermined clearance informations C, e.g. stored in memory of the device. Now the device drafts a preliminary path of travel D with the help of the clearance informations C. The clearance informations indicate in particular specific minimum distances between the rail 2 and surfaces of the stairs 3 and walls 10. Considering the clearance informations C the device 18 calculates a preliminary path of travel D as close as possible to the wall 10 along the stairs, so the space consumption of the rail is as small as possible.

In a variation the system may detect in the 3D-data of the stairs center points of each step. By interpolating all center points and putting and offset in side direction to these points, the preliminary path of travel can be calculated as well.

According to the invention, the calculating of the path of travel considers also manufacturing constraints 21 which are stored in a database 20. The database 20 can be stored locally in the device or may be accessed from a remote database via internet.

Figure 3:
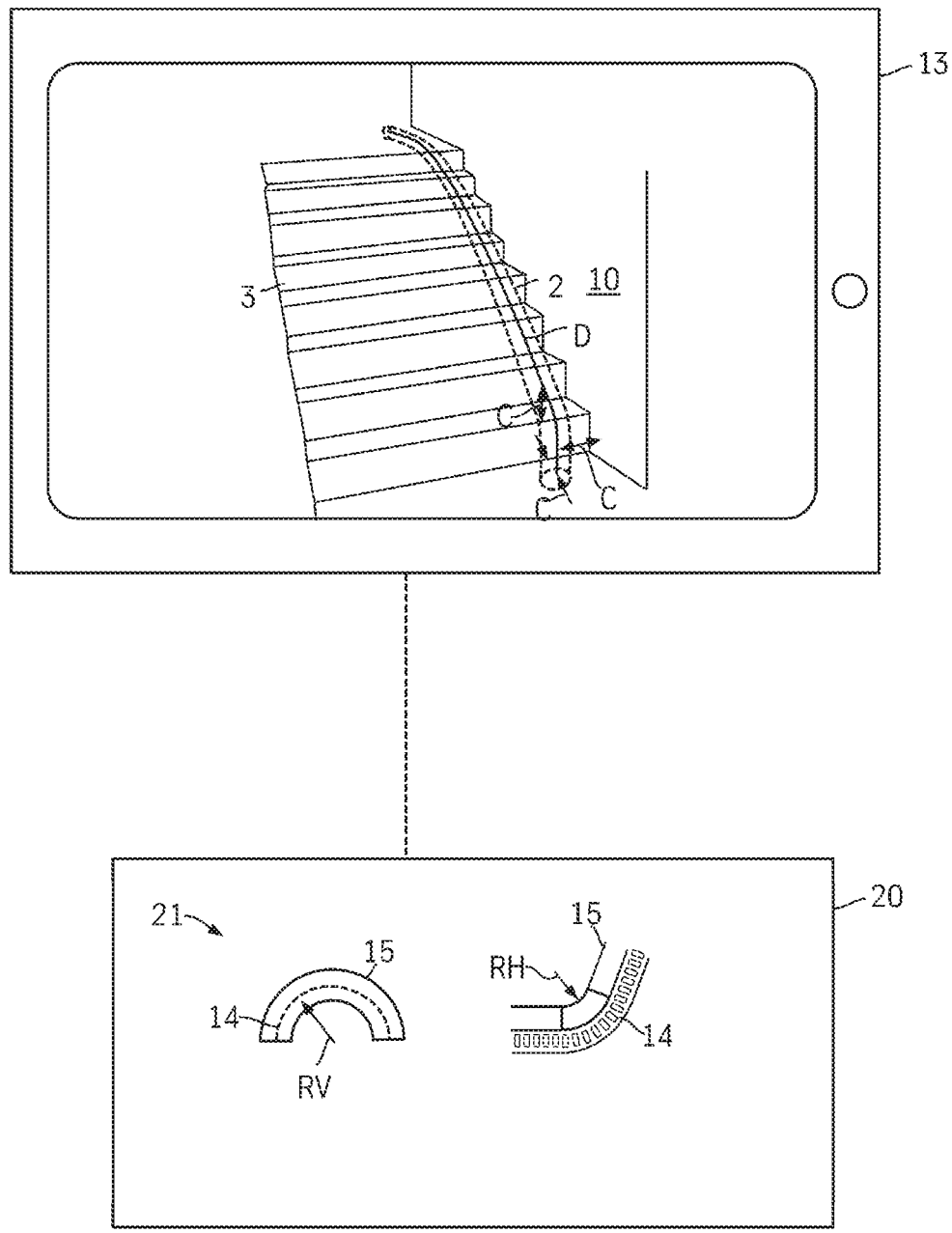
FIG. 3 is a view of the device of FIG. 2, connected to a database.

The manufacturing constraints are data stored in the database 20, defining technical limitations on an overall freedom to design a rail 2 in all imaginable configurations (FIG. 3). In particular manufacturing constraints comprise bending restrictions. So when viewed in topview, there is a minimum bending radius RV along a vertical bending axis. When viewed in side view, there is a minimum horizontal bending radius RH along a horizontal bending axis. From the FIG. 3 it is in particular evident, that a very small minimum horizontal bending radius may cause a heavy deformation at the rack compared to a straight lined rack. If the deformation at the rack 14 exceeds a certain limit, the interaction of the rack 15 with the pinions of the carrier is disturbed.

There are numerous technical limitations which lead to manufacturing constraints 21, which may also vary during time; keeping a database 20 with volatile informations updated, the device can be easily adapted to changes in the technical requirements received from the factory.

Figure 4:
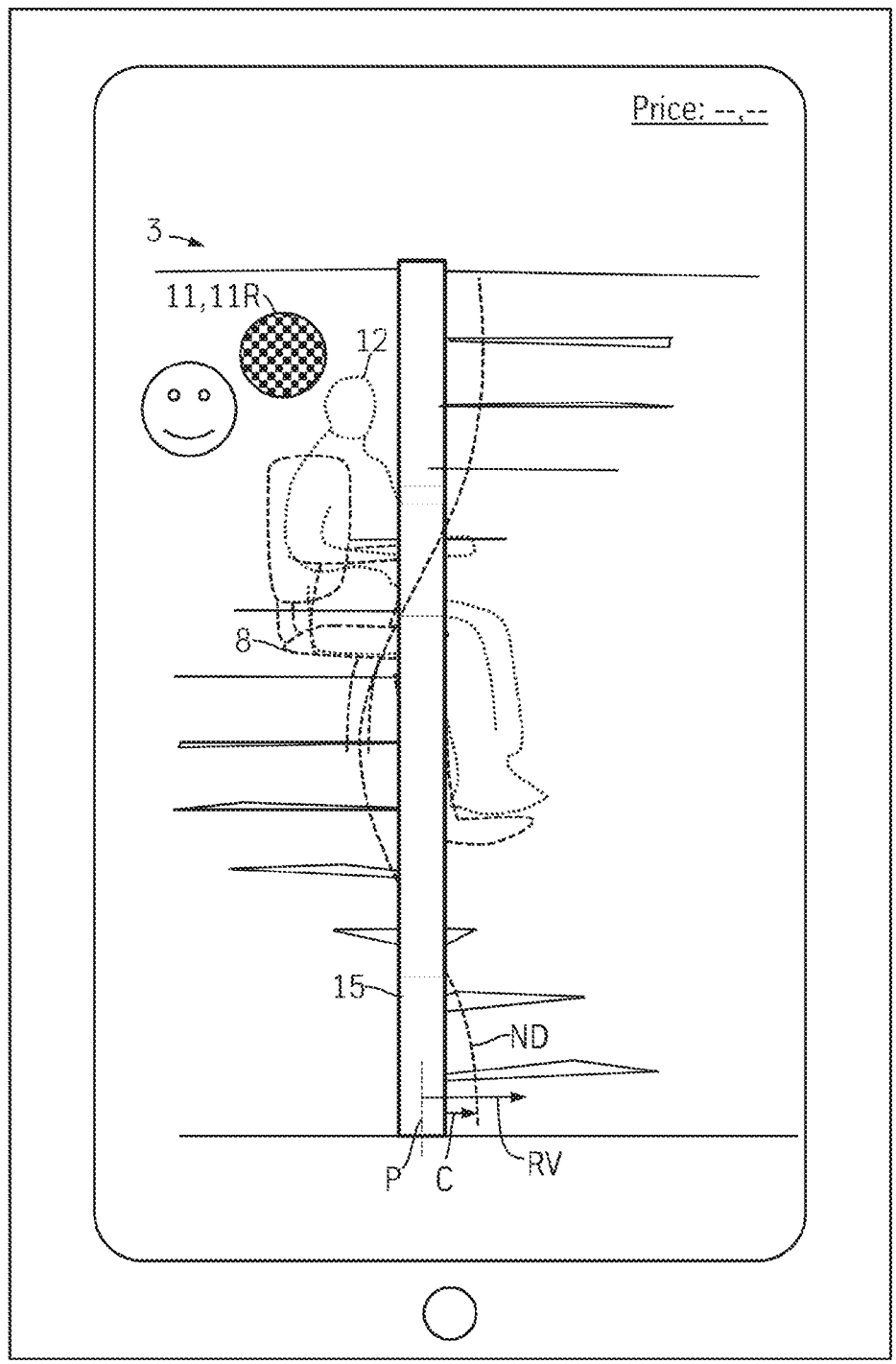
FIG. 4 is a view of the device of FIG. 2 and a stairlift with a non-feasible rail.
Figure 5:
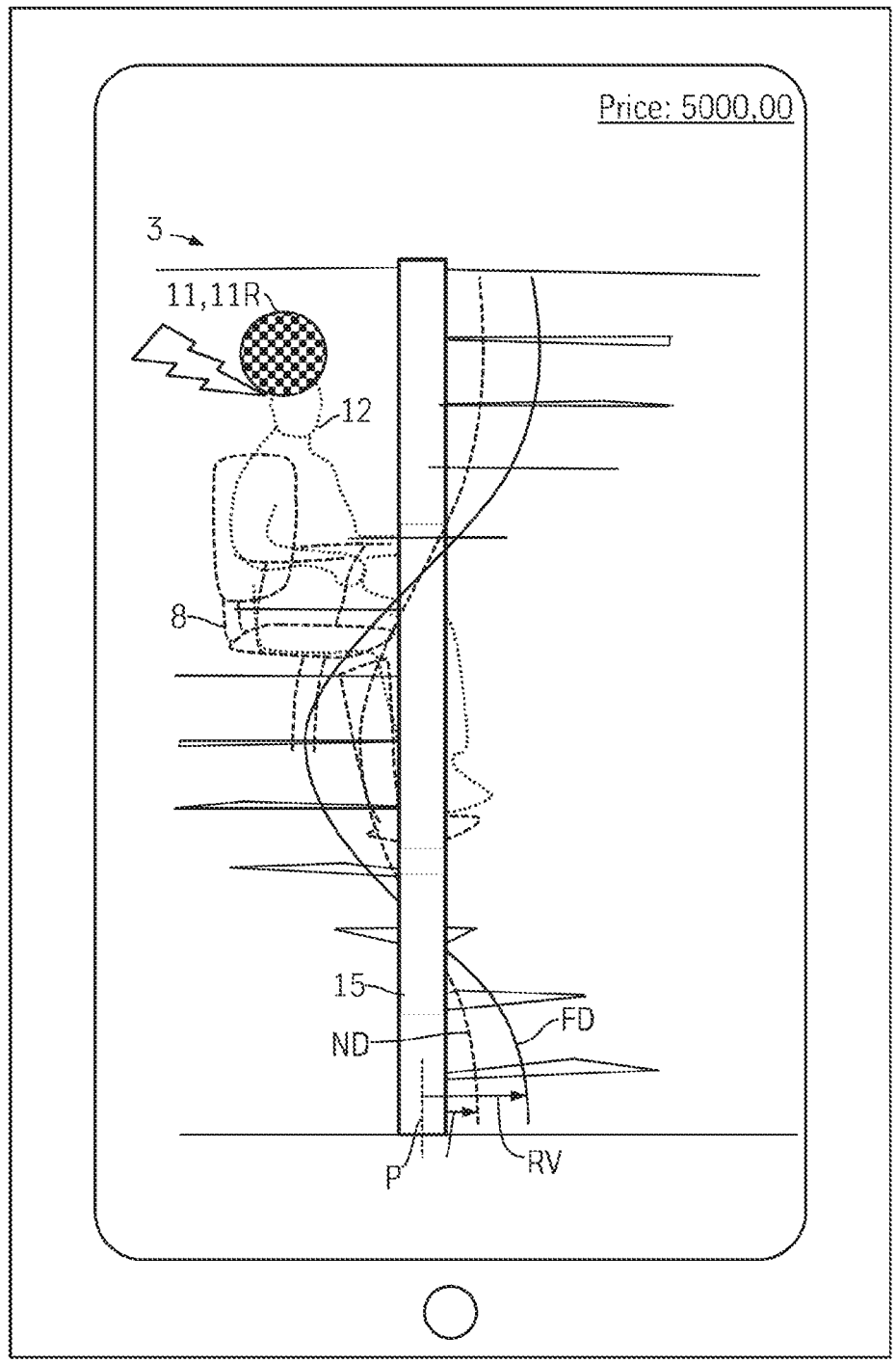
FIG. 5 is a view of the device of FIG. 2 and a stairlift with a collision situation with an obstacle.
Figure 6:
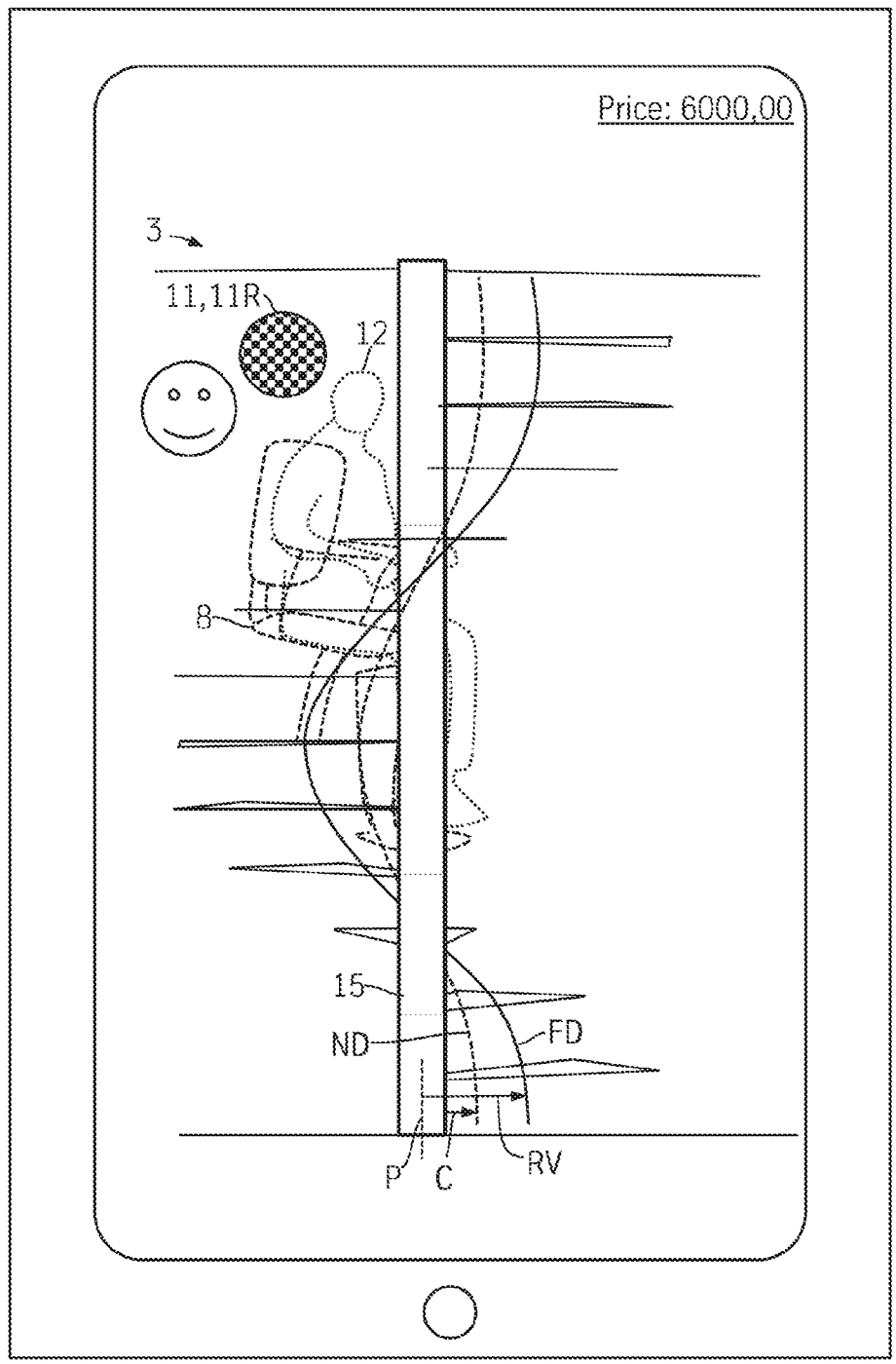
FIG. 6 is a view of the device of FIG. 2 and a stairlift with a feasible rail in a configuration avoiding the collision of FIG. 5.

With the help of FIGS. 4 to 6 the advantageous of the inventive method is illustrated. The device 13 is aimed onto a spiral staircase 3. The 3D stair data 3 of this staircase is acquired with the described methods.

In an embodiment (FIG. 4) a first initial path of travel ND is calculated merely on the basis of the clearance informations C or may be obtained in any other form. A main example of the content of the clearance informations C here is exemplarily a minimum distance in radial direction between the first initial path of travel ND and the surface of the center post 15 of the spiral staircase 3. At this point no manufacturing constraints have been considered during calculation. Again here also a virtual chair and a virtual person sitting on the chair are presented to the user by the screen of the device 13. FIG. 4 shows the representation of the stairlift in a first configuration on the augmented reality device. A price cannot be displayed because the stairlift does not conform with manufacturing constraints, consequently a bill of material cannot be established.

In an embodiment the system acquires and analyses 3D environmental data 11. These 3D environmental data comprise data referring to real objects, in particular real obstacles 11R and/or surfaces in the vicinity of the staircase 3, which are directly related to the stairlift. However these 3D environmental data 11 may comprise date referring to a real object 11R, here a bulkhead 11R, which may collide with the stairlift and/or the person 12 sitting on the stairlift 1 during traveling along the path of travel.

In the given configuration shown in FIG. 4 there is no risk that the person collides with an obstacle 11R. So in this configuration a cheaper version of the stairlift may be used, which has no tilting/swiveling ability.

However due to the narrow shape of the spiral staircase 1 the first initial path of travel ND would result in a non feasible embodiment, since the bending tools are not able to manufacture the rail. Consequently the first initial path ND of travel is a non feasible path of travel. Here the actual bending radius along a horizontal axis (here the center line of the post) is in conflict to a respective feasible minimum bending radius RV as a manufacturing constraint 21, which is retrieved from the database 20 (FIG. 3).

In an inventive embodiment (FIG. 5) the device 13 automatically calculates a second amended path of travel FD (feasible path of travel), considering the manufacturing constraints 21, i.e. the minimum bending radius RV. However the second amended path of travel FD here leads to a collision with the person 12 and the obstacle 11R. The collision situation can be calculated by comparing the 3D person data in different position along the second amended/feasible path of travel FD and the 3D person data 12. FIG. 5 shows the representation of the stairlift in a second configuration on the augmented reality device. Since the stairlift conforms to manufacturing constraints a price can be calculated and will be displayed on the augmented reality device.

To solve that collision situation a more expensive stairlift can be used which has an ability to swivel or tilt around an axis as shown in FIG. 6. So the system automatically proposes to use a lift having a configuration comprising the swiveling/tilting ability The proposal is based on try and error. As shown in FIG. 6 the chair can now swivel to avoid a collision between the person and the object, in particular real obstacle 11R. FIG. 6 shows the representation of the stairlift in a third configuration on the augmented reality device. Since the stairlift also conforms to manufacturing constraints a price can be calculated and will be displayed on the augmented reality device. Due to the more expensive configuration (including swiveling/tilting ability) the price of the stairlift is increased compared to the previous configuration.

The shown prices are merely for illustration purposes.

LIST OR REFERENCE SIGNS 1 platform lift
2 rail
3 staircase
4 first landing area
5 second landing area
6 drive unit
7 carrier
8 platform/seat
9 leveling mechanism
10 wall
11 environmental data/data referring to an obstacle
11R real obstacle
12 person
13 mixed reality device
14 rack of rail
15 tube of rail
20 database
21 manufacturing constraints
15 post of spiral staircase
RV minimum bending radius (around vertical axis)
RH minimum bending radius (around horizontal axis)
LS maximum length of one rail segment
D path of travel (unspecified)
FD second amended path of travel/feasible path of travel
ND first initial path of travel/non feasible path of travel
C clearance information
RV minimum bending radius around vertical axis
RH minimum bending radius around horizontal axis

What is claimed is:

1. A method of planning a platform lift at a stair, the platform lift comprising a rail, a platform, a drive unit for driving the platform along the rail, wherein the platform is attached to the drive unit, the method comprising:
   acquiring 3D stair data of a stair on which the platform lift is to be installed;
   calculating based on the acquired 3D stair data a path of travel of the rail;
   retrieving manufacturing constraints from a database; and
   calculating a feasible path of travel based on the retrieved manufacturing constraints;
   calculating at least one of 3D platform data representing the platform in one or several positions along the calculated path of travel, or 3D person data representing the person in one or several positions on the platform along the calculated path of travel;
   detecting a collision situation between at least one of 3D platform data or 3D person data, and environmental data; and
   adjusting an orientation of the 3D platform at positions along the calculated path of travel at which a collision situation is detected, by at least one of tilting the platform about a first axis or swiveling the platform about a second axis in response to the detected collision situation, to eliminate the detected collision situation between either of the 3D platform data or 3D person data, and the environmental data.

2. The method of claim 1 wherein acquiring the 3D stair data is performed via an augmented reality device.

3. The method of claim 1 comprising visualizing the calculated path of travel on a screen of an augmented reality device.

4. The method of claim 1 comprising acquiring 3D environmental data via an augmented reality device.

5. The method of claim 1, wherein the step of detecting is performed via a virtual stairlift representation and/or a virtual person displayed in several positions along the path of travel.

6. The method of claim 1, comprising automatically modifying the path of travel in case a collision situation is detected.

7. The method of claim 1, comprising automatically modifying the configuration of the platform in case a collision is detected.

8. The method of claim 7 comprising automatically providing a bill of material of the platform lift having a rail according to the feasible path of travel and/or the modified platform.

9. The method of claim 8 comprising calculating the bill of material as soon as the feasible path of travel is approved by a user input.

* * * * *